United States Patent [19]
Moser et al.

[11] Patent Number: 5,246,679
[45] Date of Patent: Sep. 21, 1993

[54] ADDITION OF ORGANOPHOSPHONATES FOR SIZE CONTROL OF WET CALCIUM-BASED FGD BYPRODUCT SOLIDS UNDER INHIBITED OXIDATION CONDITIONS

[75] Inventors: Robert E. Moser, Palo Alto, Calif.; Frank B. Meserole; Gordon Maller, both of Austin, Tex.

[73] Assignee: Electric Power Research Institute, Palo Alto, Calif.

[21] Appl. No.: 696,767

[22] Filed: May 7, 1991

[51] Int. Cl.⁵ .................. C01B 17/00; C01B 17/20; C01B 17/22

[52] U.S. Cl. .................. 423/243.09; 423/242.2; 423/242.7; 423/243.08; 423/555; 423/519.2

[58] Field of Search .................. 423/242 A, 243, 555, 423/242 R, 512 A, 242.2, 242.7, 243.08, 243.09

[56] References Cited

U.S. PATENT DOCUMENTS

| | | | |
|---|---|---|---|
| 3,899,293 | 8/1975 | Bush | 423/512 |
| 4,342,733 | 8/1982 | Steelhammer | 423/242 |
| 4,454,101 | 6/1984 | Garrison et al. | 423/242 |
| 4,503,020 | 3/1985 | Weissert et al. | 423/242 |
| 4,515,754 | 5/1985 | Stehning | 423/242 |
| 4,687,649 | 8/1987 | Kuroda et al. | |
| 4,810,477 | 3/1989 | Shinoda et al. | |
| 4,818,506 | 4/1989 | Lin et al. | 423/242 |
| 4,832,936 | 5/1989 | Holter et al. | |
| 4,834,955 | 5/1989 | Morch et al. | 423/242 |
| 5,034,204 | 7/1991 | Moser et al. | 423/243 |
| 5,077,023 | 12/1991 | Leutner et al. | 423/242 |

Primary Examiner—Gregory A. Heller
Attorney, Agent, or Firm—Sixbey, Friedman, Leedom & Ferguson

[57] ABSTRACT

A process for producing large, regularly-shaped crystalline calcium sulfite solids in a wet calcium-based flue gas desulfurization system is provided. A chemical crystal modifier, preferably an organophosphonate, is added to the calcium sulfite-containing solids slurry produced by the FGD process under inhibited oxidation conditions at an addition level which promotes the formation of large, regular calcium sulfite crystals that are easily dewatered.

11 Claims, 5 Drawing Sheets (100 X)

(250 X)

(500 X)

(100 X)

(250 X)

(500 X)

ADDITION OF ORGANOPHOSPHONATES FOR SIZE CONTROL OF WET CALCIUM-BASED FGD BYPRODUCT SOLIDS UNDER INHIBITED OXIDATION CONDITIONS

TECHNICAL FIELD

The present invention relates generally to the control of wet calcium-based flue gas desulfurization FGD) processes and specifically to a method of producing an improved solids byproduct by controlling the formation of calcium sulfite crystals during the FGD process.

BACKGROUND ART

Flue gas desulfurization (FGD) processes currently in use today typically employ wet calcium-based technology to remove sulfur from various flue gas sources. Sulfur is absorbed from the flue gas as $SO_2$ into a calcium-containing liquid phase and forms calcium sulfite or calcium bisulfite. At least some of calcium sulfite or bisulfite will be oxidized to calcium sulfate. The amount of calcium sulfate produced will depend, in large measure, on the amount of excess oxygen in the flue gas. Crystals of calcium sulfite or calcium sulfate, primarily as gypsum ($CaSO_4.2H_2O$), will form as the respective critical relative saturations for each of the compounds is exceeded in the liquid phase. If the ratio of the amount of sulfite oxidized to sulfate compared to the total amount of sulfur compounds absorbed from the flue gas is less than 15 to 18%, all of the sulfur will be purged from the FGD system as a coprecipitate within the calcium sulfite crystal matrix. If this occurs, the calcium sulfate or gypsum relative saturation in the liquid phase will never exceed 1.0, and, therefore, calcium sulfate or gypsum precipitation cannot occur.

The widespread use of calcium-based wet scrubbers for controlling $SO_2$ emissions from utility boilers and the like generates as waste quantities of calcium sulfate and/or calcium sulfite solids in the range of 5 to 10 million tons annually in the United States. This material is currently disposed of primarily in ponds and landfills. The volume of this FGD waste material and the disposal methods currently employed depends largely on the chemical composition of the precipitated solids. Calcium sulfate dihydrate (gypsum) solids are generally larger and more regularly shaped than are calcium sulfite hemihydrate solids. While gypsum can usually be dewatered to produce about 85% solids, only about 50 to 70% calcium sulfite hemihydrate solids can typically be produced. Moreover, the calcium sulfite sludges tend to exhibit thixotropic-like behavior, which increases the difficulty and expense of their disposal.

The size and shape of calcium sulfite crystals produced in the wet calcium-based FGD processes can affect the dewatering and handling characteristics of the resulting waste product. The performance of the dewatering equipment can be affected significantly by the size and shape of these crystals. If the crystals or particles are smaller than about 5 microns, they will impede filtration by blinding the filter media or forming a fine film on the solids being filtered, thus reducing the filtration rate and increasing the amount of moisture retained by the calcium sulfite or gypsum. Additionally, if the solids produced by FGD processes is to be a useful product, the ability to control the particle size, moisture content and impurity level is critical.

The calcium sulfite solids disposal problems could be reduced by modifying available FGD processes to produce larger crystals. FGD process sludges could be dewatered more easily and with greater efficiency if the size and shape of the crystals and particles was larger and more regular. In addition, new systems could be designed with smaller, less expensive dewatering and disposal equipment.

The prior art has proposed solutions to the gypsum scale and calcium sulfite/calcium sulfate disposal problem in flue gas desulfurization systems. U.S. Pat. No. 4,342,733 to Steelhammer et al. discloses a method of inhibiting sulfite oxidation in scrubber liquor of the type containing sulfite species. A "topping" agent, which may be a polyphosphate or an organophosphonate or a mixture of these two types of compounds is added to the scrubber liquor to supplement and enhance the performance of specified sulfite antioxidants such as linear polyethyleneamines and substituted secondary and tertiary aromatic amines. This patent nowhere suggests the use of either polyphosphates or organophosphates to control crystal growth generally or calcium sulfite crystal size and shape or crystal habits specifically.

U.S. Pat. No. 4,818,506 to Lin et al. discloses the use of organophosphonates as gypsum scale inhibitors. Lin et al. does not suggest the use of organophosphonates to control calcium sulfite crystal size or shape in an inhibited oxidation environment in a wet calcium-based FGD system which is operating subsaturated with respect to gypsum.

The prior art, therefore, has failed to provide a method of treating wet calcium-based flue gas desulfurization process byproduct solids under inhibited oxidation conditions which controls the size and shape of the calcium sulfite crystals in these solids. A need exists, therefore, for a method of treating wet calcium-based FGD byproduct solids under inhibited oxidation conditions which permits control of the size and shape of the calcium sulfite and other crystalline solids produced by this process.

SUMMARY OF THE INVENTION

It is a primary object of the present invention, therefore, to overcome the disadvantages of the prior art and to provide a method for controlling the size and shape of calcium sulfite crystals formed under inhibited oxidation conditions in a wet calcium-based flue gas desulfurization system.

It is another object of the present invention to provide a method for modifying the precipitation and growth characteristics of calcium sulfite in a wet calcium-based flue gas desulfurization process to produce a solid waste product with improved physical properties.

It is a further object of the present invention to provide a method for producing calcium sulfite byproduct solids from a wet calcium-based FGD process under inhibited oxidation conditions which are easily dewatered and easily handled for disposal.

It is yet another object of the present invention to provide a method for treating FGD byproduct solids which substantially reduces the production of calcium sulfite particles with a size of less than 5 microns.

The aforesaid objects are achieved by providing a wet calcium-based flue gas desulfurization system which employs a chemical crystal habit modifier to improve the quality of the calcium sulfite crystals in the FGD byproduct solids under inhibited oxidation conditions. The present invention provides a method for producing large, regular calcium sulfite crystals that are easily dewatered in a wet calcium-based flue gas desulfurization system conducted under inhibited oxidation conditions favoring the formation of calcium sulfite solids in the system. An amount of a chemical crystal modifier is added to the system to cause the formation of substantially regularly shaped, large calcium sulfite crystals. A slurry of FGD byproduct solids is held under inhibited oxidation conditions, while stable operating pH, temperature, slurry solids concentration, liquid-to-gas ratio and additive concentration are maintained. A chemical crystal habit modifier, which may be selected from the group consisting of organophosphonates, polyphosphates and organic phosphates, is added to the slurry at a level of less than 200 ppm. Preferred crystal habit modifiers are organophosphonates and polyphosphates. The preferred organophosphonates are aminotri (methylene phosphonic acid) (ATMP), hydroxyethylidene-1,1-diphosphonic acid (HEDP), hexamethylenediamine tetra(methylene phosphonic acid) (HTMP) and diethylenetriamine penta(methylene phosphonic acid) (DTPMP) and the preferred polyphosphate is polyphosphoric acid (PPA). An especially preferred crystal habit modifier is ATMP added at a level of about 20 ppm, which effectively increases the size, thickness and settling properties of calcium sulfite crystals in an inhibited oxidation environment.

Other objects and advantages will be apparent from the following description, drawings and claims.

DESCRIPTION OF THE PREFERRED EMBODIMENTS

Flue gas desulfurization (FGD) processes which employ wet calcium-based technology produce gypsum solids if oxidization conditions are sufficient to favor the oxidation of calcium sulfite to calcium sulfate. If oxidation is inhibited, the formation of calcium sulfite particles is favored. This byproduct can be a waste substance which requires expensive disposal methods because of the large volumes that are typically produced. However, if the FGD processing conditions are adjusted to favor the formation of large calcium sulfite crystals, these problems can be reduced.

The present invention is directed to the use of chemical crystal habit modifiers under inhibited oxidation conditions to modify the precipitation and growth characteristics of calcium sulfite byproduct solids in a wet calcium-based FGD system. The calcium sulfite crystals produced according to the present invention are larger, thicker and more uniform in size than they would otherwise be in untreated FGD byproduct solids. The crystal habit modifier-treated FGD byproduct solids produced according to the present invention also exhibit improved settling and dewatering properties.

Because the size and shape of the calcium sulfite crystals produced in a wet calcium-based FGD system have a significant effect on the characteristics of the waste byproduct ultimately produced by this system, the control of crystal size and shape is essential to reducing the costs of dewatering and disposal processes. Additionally, the ability to control crystal size and shape in accordance with the present invention permits the optimization or elimination of dewatering and other processing equipment. The present method forms large, thick, substantially uniformly sized calcium sulfite crystals that exceed significantly 50 microns. The typical size range for calcium sulfite particles produced in wet scrubbers is 10 to 20 microns. Small calcium sulfite particles less than 5 microns in size can have significant adverse effects on the dewatering of calcium sulfite byproducts produced by FGD processes. These very small particles impede filtration by blinding the filter media or by forming a fine film on the filter cake that both reduces the filtration rate and increases the amount of moisture retained by the calcium sulfite byproduct solids. Consequently, the large crystal calcium sulfite byproduct produced by the present invention avoids these problems and is easily dewatered to produce a high solids product.

Applicants' copending U.S. patent application Ser. No. 696,768, filed May 7, 1991, entitled "Addition of Organophosphonates for Size Control of Wet Calcium-Based FGD Byproduct Solids Under Forced Oxidation Conditions" describes the production of calcium sulfate dihydrate (gypsum) crystals of large size and substantially regular shape. The disclosure of this application is hereby incorporated herein by reference.

Figure 1:
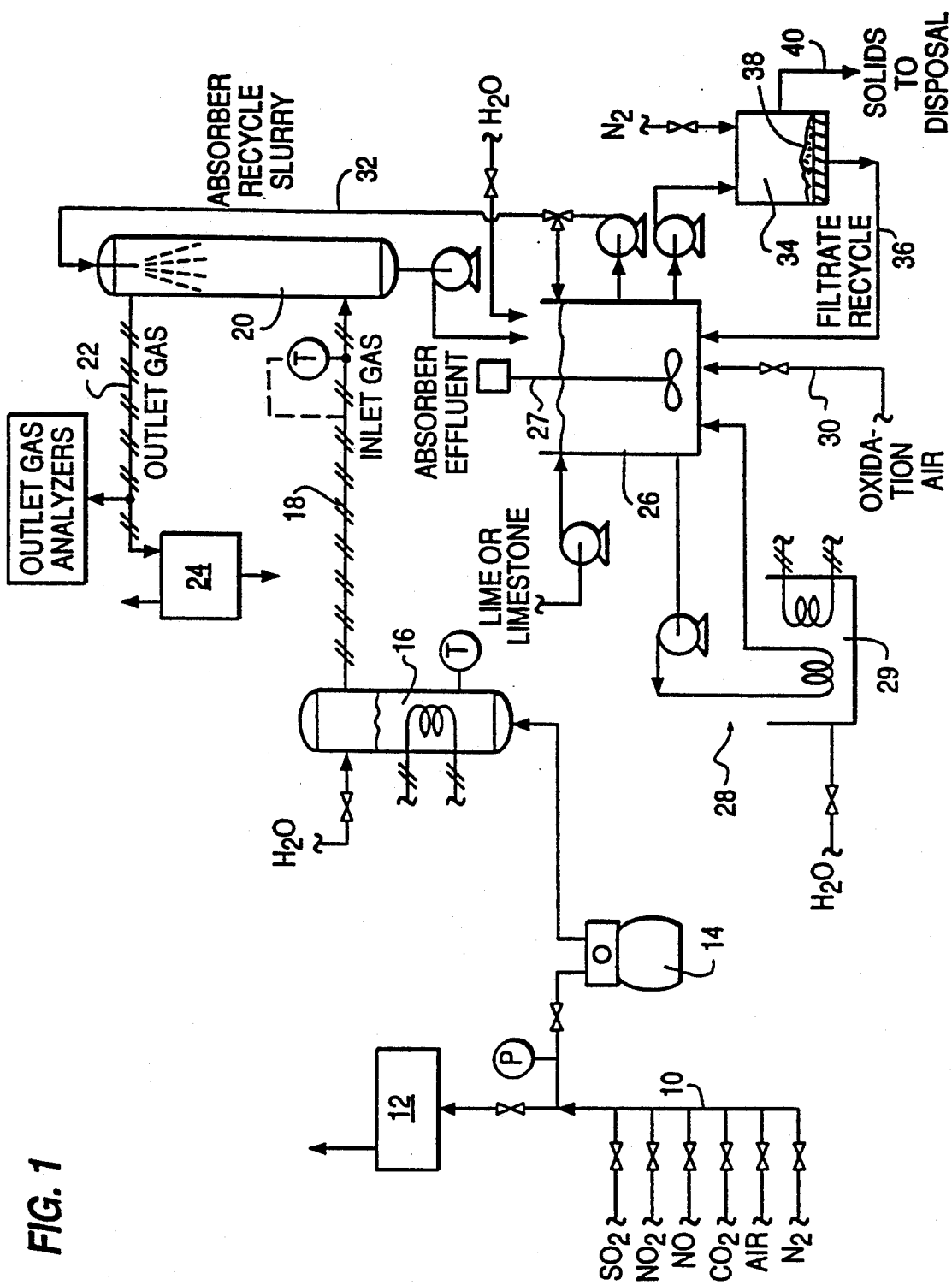
FIG. 1 illustrates schematically a bench scale wet calcium-based flue gas desulfurization system.

Referring to the drawings, FIG. 1 illustrates, schematically, a 5-acfm bench scale FGD system which has been used to demonstrate the effectiveness of the present method in controlling the crystal growth characteristics of FGD byproduct solids. Although the present invention is described herein primarily with respect to the performance of this process on bench scale-sized apparatus, the process may be performed equally efficiently and effectively on full scale FGD apparatus equivalent to that described herein.

Synthetic flue gas containing $SO_2$ is produced by an inlet gas manifold system 10. A portion of the inlet gas is analyzed by inlet gas analyzers 12. The remainder of the $SO_2$-containing flue gas is directed to a dry gas meter 14 and then to a water saturator and heater column 16. The flue gas, which is saturated at a temperature of approximately 50° C., then flows through a heated gas line 18 where it is heated to 190° C. and to an absorber or scrubber 20, which may be a spray tower or bubbler. The scrubbed gas flows from the absorber 20 through a heated outlet gas line 22, to an outlet gas analyzer, to a knock-out vessel 24 and is vented or directed to a drain, as appropriate. Gas in the absorber is contacted by slurry from the reaction tank 26. Effluent from the absorber 20 and make-up water are directed into a reaction tank 26 equipped with a variable speed mixer 27 for agitation. A source of calcium, preferably lime or limestone is also added to the reaction tank to control pH. The contents of the reaction tank are heated in a reaction tank heater loop 28 which includes a heated water bath 29.

Oxidation is inhibited in the reaction tank by providing a constant supply of an oxidation inhibitor to the reaction tank through line 30. One especially effective oxidation inhibitor is thiosulfate ions. These may be added directly as a thiosulfate salt or formed in situ by the addition of elemental sulfur. The combined addition of thiosulfate and an EDTA-type compound has been found to be particularly effective in inhibiting oxidation in FGD systems. The disclosure of commonly owned U.S. Pat. No. 4,994,246, issued on Feb. 19, 1991, which discloses the inhibition of oxidation in FGD systems with thiosulfate and EDTA-type compounds, is hereby incorporated herein by reference. Although thiosulfate and thiosulfate combinations are preferred oxidation inhibitors, any oxidation inhibitor which inhibits the oxidation of calcium sulfite to calcium sulfate could also be used.

Slurry from the reaction tank is circulated to the absorber through line 32 and through the absorber back to the reaction tank where calcium sulfite solids precipitate to form a slurry. Some of the reaction tank slurry is recycled back to the absorber. The reaction tank slurry is also drained from the reaction tank and directed through an in-line filter 34 to collect calcium sulfite solids and control the solids concentration of the slurry. The filtrate is recycled through line 36 back to the reaction tank 26. The filtered calcium sulfite solids 38 are then routed through line 40 and disposed of.

The calcium sulfite hemihydrate crystal system is orthorhombic with eight molecules in a unit cell. Under the conditions encountered in wet calcium-based FGD scrubbers, calcium sulfite hemihydrate is usually never precipitated in a pure form, but forms a solid solution with sulfate. The amount of sulfate substituted into the crystal lattice seems to have an effect on the shape and size of the crystals. Generally, calcium sulfite is precipitated as thin platelets from limestone-based scrubbers or as agglomerates or "rosettes" from lime-based systems. The platelet forms can vary from mostly single crystals with aspect ratios of about 1:2:20 to platelets with substantial amounts of dendritic growth. The average particle size, the length of the longest dimension, is typically 10 to 20 microns. The rosette forms are highly dendritic clusters of thin blades growing out from the center. The result is the formation of nearly spherical particles with diameters typically ranging from 10 to 50 microns.

The precipitation of a salt from an aqueous solution can proceed by two processes, namely nucleation and crystal growth. A necessary criterion for precipitation to occur is that the solution be supersaturated with respect to the compound of interest. The degree of saturation or relative saturation (RS) of a solution towards a specific compound, such as calcium sulfite hemihydrate for example, can be defined as:

$$RS = (a_{Ca+2} \cdot a_{SO_3-2} \cdot a_{H_2O})/K_{sp}(T)$$

where: $a_i$ is the activity of species, i.
The activity of a dissolved species is a complex function of its concentration and all other dissolved species.

Figure 2:
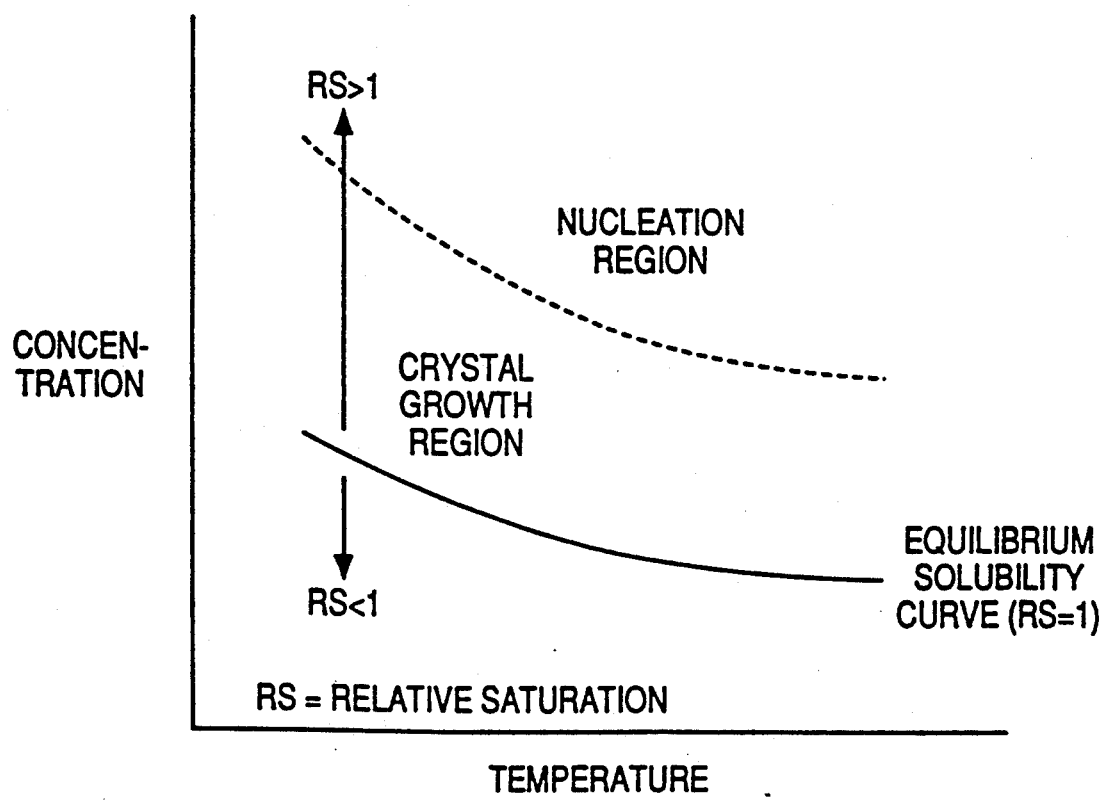
FIG. 2 represents graphically the relationship between relative saturation and solution concentration as a function of temperature for a gypsum crystal system.

FIG. 2 represents, graphically, the relationship of relative saturation and solution concentration as a function of temperature, and depicts the crystal growth and nucleation regions. A liquid whose composition falls below the solid line in FIG. 2 is subsaturated. In the area above the solid line, the solution is supersaturated and precipitation is possible. In the area bounded by the solid and dotted lines in FIG. 2, precipitation can be controlled by seed crystal growth. An increase in supersaturation, however, will reach a level at which precipitation will occur both by crystal growth mechanism and nucleation. In the FGD system, the conditions favorable to the creation of new calcium sulfite crystal nuclei also tend to reduce average particle size. If no seed crystals are present, the calcium sulfite will precipitate at relatively high supersaturation levels as primary nucleation. However, the presence of seed crystals produces secondary or collision nucleation at substantially lower supersaturation levels. Secondary nucleation will occur in a seeded crystallizer at all relative saturations greater than 1.0. In the absence of chemical growth modifiers, the control of the amount of solids in the recirculation loop and the degree of crystal breakage or attrition are the primary variables for controlling crystal sizes.

The present invention is premised on chemically modifying the precipitation or crystal formation of calcium sulfite to change its crystal growth rate and nucleation characteristics to favor the formation of large crystals. The addition level of the crystal modifiers is controlled to significantly reduce nucleation without completely inhibiting crystal growth. As a result, the formation of small crystals is reduced, and the shape of the crystals is modified. Typically, precipitation inhibition by crystal modifiers occurs by one and/or two mechanisms. In one case, the chemical can adsorb to the surfaces of growing crystals and thereby reduce the overall growth rate. The additive can also interact with the molecular cluster of the substance in solution and prevent the formation of stable microcrystalline nuclei. In general, the inhibition of nucleation will result in the formation of larger crystals.

The ability of additives to alter the shape of precipitated crystals is due to the preferential adsorption on certain faces of the crystal. Most often, adsorbed species tend to inhibit the rate of growth on the affected faces. This process tends to cause these faces to become larger relative to the unaffected faces. Depending upon the degree of chemical interactions, these adsorbed species may be displaced during subsequent growth or partially entrapped into the crystal.

Calcium sulfite and/or calcium sulfate crystal growth can be modified by carboxylic acids, polyacrylates, sulfonates, organic phosphates, polyphosphates and organophosphonates. The crystal growth modifiers preferred for use in the process of the present invention include organophosphonates and polyphosphates. Preferred organophosphonates, which are shown in Table I below, are ATMP: aminotri(methylene phosphonic acid), HEDP: hydroxyethylidene-1,1-diphosphonic acid, HTMP: hexamethylenediamine tetra(methylene phosphonic acid) and DTPMP: diethylenetriamine penta(methylene phosphonic acid). A preferred polyphoshate is PPA: polyphosphoric acid.

TABLE I

Polyphosphoric Acid (PPA)

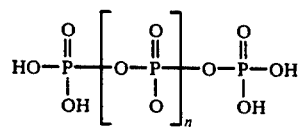

ATMP (MW = 299)

TABLE I-continued

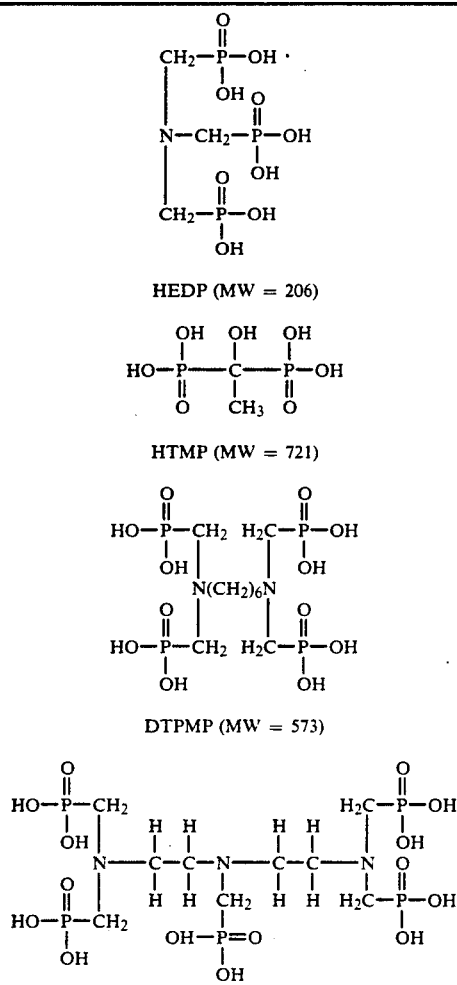

HEDP (MW = 206)

HTMP (MW = 721)

DTPMP (MW = 573)

Organic phosphonates differ from polyphosphates and organic phosphates in that their structure includes extremely stable carbon-phosphorous bonds that are not readily subjected to chemical degradation. In addition, organic phosphonates are biodegradable. Consequently, these compounds are especially suited to the FGD process environment and also do not themselves create a waste problem.

The foregoing crystal modifiers have been found to be very effective in influencing calcium sulfite crystal size in a flue gas desulfurization system under inhibited oxidation conditions at relatively low addition levels of less than 200 ppm. The most effective addition level will depend to a large extent on the specific chemical crystal modifier used.

Although polyacrylates are effective crystal growth modifiers, the use of these compounds either alone in combination with the organophosphonates or other crystal modifiers is not recommended. Calcium sulfite crystal growth may be inhibited too severely by the inclusion of a polyacrylate with the preferred crystal habit modifiers.

Figure 3A:
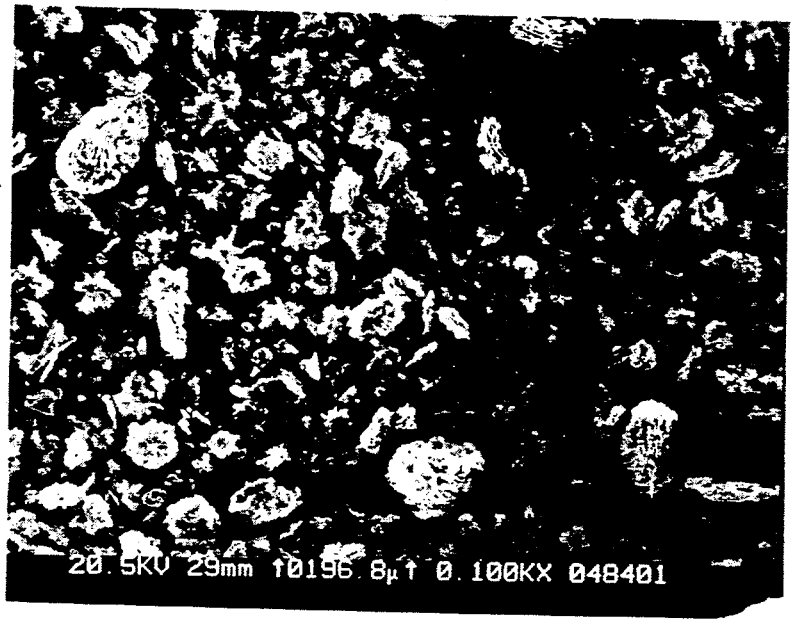
FIGS. 3(A), (B), and (C) are electron micrographs of FGD byproduct calcium sulfite crystals to which no crystal modifier has been added.
Figure 3B:
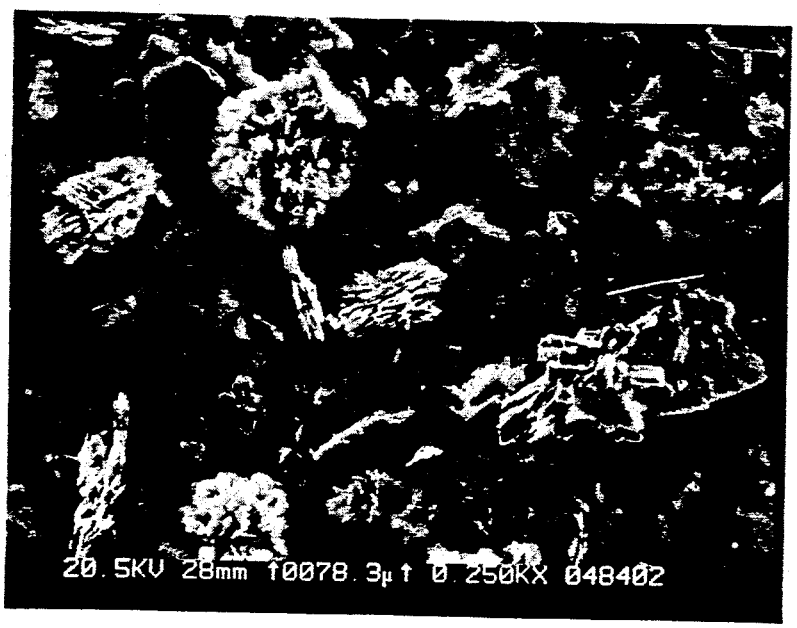
Figure 3C:
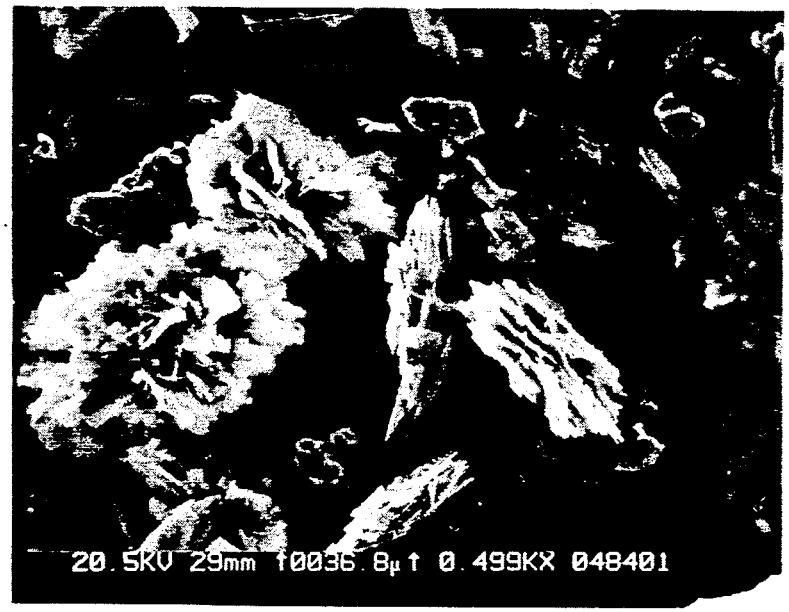
Figure 4A:
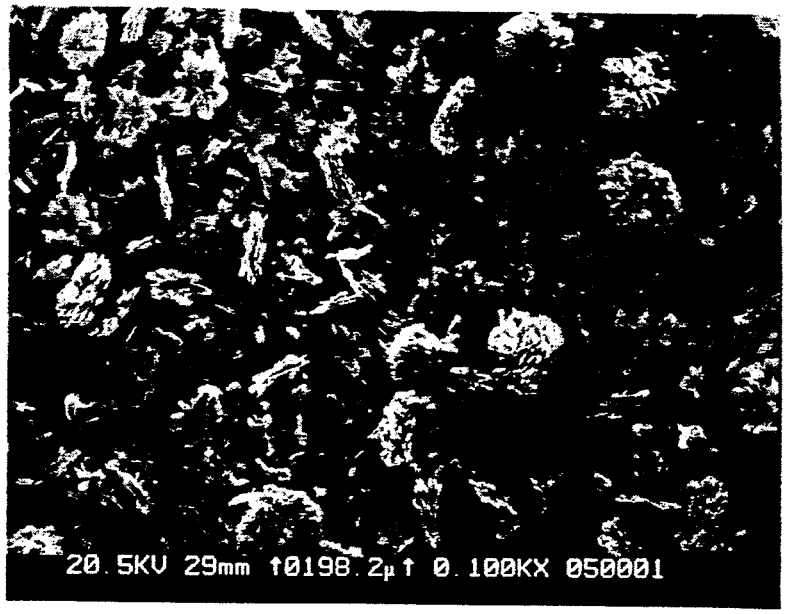
FIGS. 4 (A), (B), and (C) are electron micrographs of FGD byproduct calcium sulfite crystals modified by ATMP.
Figure 4B:
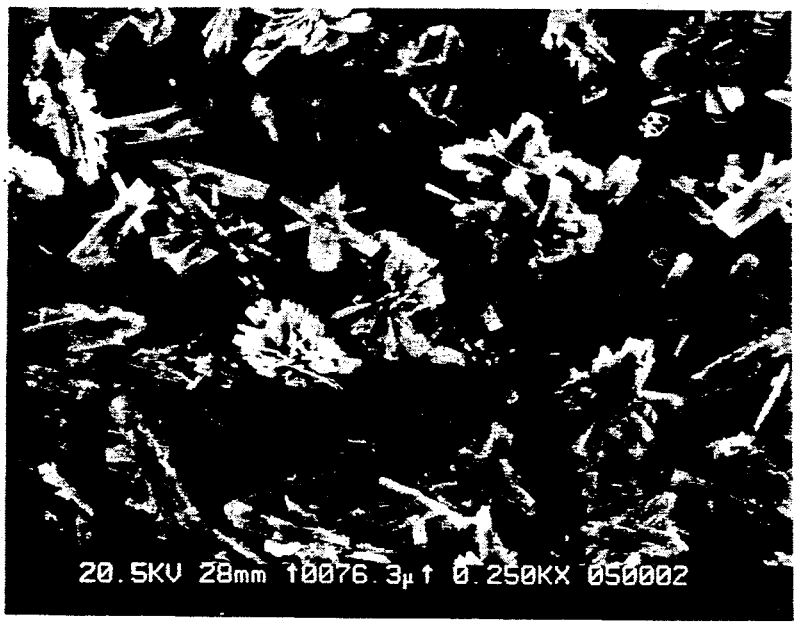
Figure 4C:

FIGS. 3 and 4 illustrate, respectively, scanning electron micrographs of unmodified (base case) and ATMP-modified calcium sulfite crystals. These crystals were produced in the FGD system shown in FIG. 1 under inhibited oxidation conditions as a result of the addition of thiosulfate to the reaction tank 26. The system was operated to maintain stable operating conditions for pH, temperature, slurry solids concentrations, liquid-to-gas ratio and additive concentration. The pH was maintained by adding limestone slurry to the reaction tank according to a pH feedback control. The slurry solids was held constant by filtering a slipstream of slurry at a rate of about 1.2 grams of solids per minute. Additive level was 20 ppm. The crystals produced under these conditions can be characterized as dendritic clusters of thin blades growing out from the center, which are referred to as rosettes. Table II summarizes the experimental variables and operating conditions under which these crystals were produced.

TABLE II

| Test Description (Inhibited Oxidation) | Temp (F.) | pH | Gas Flow (acfm) | Slurry Flow (gpm) | SO2 Removal (%) | Solids Prod. Rate (g/min) | Limestone Feed Rate (g/min) | Solids Conc. (Wt. %) | [SO3] (mM/L) | Inlet SO2 (gpm) | Sulfite oxid (%) | Solids Res. Time (Min) | [S2O3] (mM/L) |
|---|---|---|---|---|---|---|---|---|---|---|---|---|---|
| Base Case | 122 | 5.8 | 5.1 | 0.5 | 69 | 1.15 | 1.13 | 5.2 | 34.0 | 1700 | 15 | 378 | 6.6 |
| 20 ppm ATMP | 122 | 5.8 | 5.2 | 0.5 | 67 | 1.15 | 1.13 | 5.6 | 34.0 | 1700 | 15 | 379 | 6.8 |

The effect of the ATMP on the size and shape of the crystals is clearly evident in these micrographs. The crystals grown with ATMP have thicker blades and less dendritic growth than the base case crystals. In addition, there appears to be considerably less fine material.

Tests were performed to evaluate the settling properties of the solids. Experience has shown that these tests are very sensitive to subtle differences in the physical properties of solids which, quite often, cannot be observed in photomicrographs. Settling test results are reported as thickener unit area required to achieve a specified underflow concentration. Properties which tend to affect the settling rate of a solid include size, shape, and the amount of finer-sized material. The results of the settling tests are summarized in Table III below. These results are consistent with the photomicrographs. The ATMP-modified crystals show an increase in settling rate as a result of the larger and thicker crystals requiring half the thickener unit area to achieve the same underflow solids as the base case solids.

TABLE III

| Test Description | Unit Area (ft 2/t * d) | Underflow Solids Conc. (Weight %) |
|---|---|---|
| Base Case - Inhibited Oxidation | 32.1 | 12 |
| 20 ppm ATMP - Inhibited Oxidation | 15.9 | 12 |

The improvement in settling and dewatering properties produced by the present invention could eliminate the need for thickeners entirely and allow the use of hydrocyclones, by direct disposal or by stacking which would substantially reduce the costs of the process. Moreover, because smaller secondary dewatering devices such as filters and centrifuges can be used by the present process, additional savings can be achieved, which further decreases the costs of the process.

The effectiveness of the present process in producing large crystals may require the addition of a particle grinding loop to replenish crystals removed in the blowdown from the FGD system. In addition, the particle grinding loop may be used alone or in connection with the crystal modifier to provide precise control of crystal size.

The present process has been described with respect to specific chemical crystal modifiers. However, it is contemplated that any calcium sulfite crystal modifier which inhibits nucleation rates to a greater extent than crystal growth rates and is stable in the scrubber environment can be employed as well.

INDUSTRIAL APPLICABILITY

The method of the present invention will find its primary application in modifying calcium sulfite crystal growth in FGD systems employing wet calcium-based technology. However, this method may be employed in any calcium sulfite crystal-producing process in which it is desired to control calcium sulfite crystal growth, size and habit.

We claim:

1. A method for improving the properties of calcium sulfite solids produced as a byproduct of a wet calcium-based flue gas desulfurization process conducted under inhibited oxidation conditions to favor the formation of calcium sulfite over calcium sulfate, consisting essentially of contacting a sulfur oxide-containing gas with calcium to produce calcium sulfite solids; adding to said calcium sulfite solids an amount of a crystal growth habit modifier selected from the group consisting of organophosphonates and polyphosphates which inhibits nucleation of a greater extent than crystal growth sufficient to produce substantially regularly-shaped calcium sulfite crystals greater than 50 microns in size; and recovering substantially regularly-shaped calcium sulfite crystals greater than 50 microns in size.

2. The method described in claim 1, wherein less than 200 ppm of said crystal growth habit modifier is added to said slurry.

3. The method described in claim 2, wherein said crystal growth habit modifier is a polyphosphate.

4. The method described in claim 1, wherein said crystal growth habit modifier comprises an organophosphonate.

5. The method described in claim 4, wherein said crystal growth habit modifier is an organophosphonate selected from the group consisting of aminotri (methylene phosphonic acid), hydroxyethylidene-1, 1-diphosphonic acid, hexamethylenediamine tetra (methylene phosphonic acid) and diethylenetriamine penta (methylene phosphonic acid).

6. The method described in claim 5, wherein 20 ppm of aminotri (methylene phosphonic acid) is added to said slurry.

7. The method described in claim 3, wherein said polyphosphate comprises polyphosphoric acid.

8. The method described in claim 1, wherein oxidation of calcium sulfite to calcium sulfate is inhibited by the addition to said slurry of an oxidation inhibitor selected from the group consisting of thiosulfate, elemental sulfur and thiosulfate and EDTA.

9. The method described in claim 1, wherein said flue gas desulfurization process includes a particle grinding loop for replenishing calcium sulfite crystals removed from said process.

10. A method for improving the properties of calcium sulfite solids produced as a byproduct of a wet calcium-based flue gas desulfurization process wherein the oxidation of calcium sulfite to calcium sulfate is inhibited by the addition of thiosulfate, comprising contacting a sulfur oxide-containing gas with calcium to produce calcium sulfite solids and adding 20–200 ppm of aminotri (methylene phosphonic acid) to a slurry of said calcium sulfite solids to produce substantially regularly shaped calcium sulfite crystals greater than 50 microns in size.

11. The method described in claim 10, wherein 20 ppm of aminotri (methylene phosphonic acid) is added to said slurry.

* * * * *